United States Patent
Hesse et al.

(10) Patent No.: US 8,857,879 B2
(45) Date of Patent: Oct. 14, 2014

(54) FASTENING OF A LONGITUDINAL BEAM LINING ON A LONGITUDINAL BEAM OF A MOTOR VECHICLE

(75) Inventors: Frank Hesse, Treuchtlingen (DE); Norbert Sandner, Fürth (DE); Egon Mayr, Tegernbach (DE); Holger Titze, München (DE)

(73) Assignee: Faurecia Exteriors GmbH (DE)

( * ) Notice: Subject to any disclaimer, the term of this patent is extended or adjusted under 35 U.S.C. 154(b) by 68 days.

(21) Appl. No.: 13/522,105

(22) PCT Filed: Jan. 12, 2011

(86) PCT No.: PCT/EP2011/050290
§ 371 (c)(1),
(2), (4) Date: Jul. 13, 2012

(87) PCT Pub. No.: WO2011/086072
PCT Pub. Date: Jul. 21, 2011

(65) Prior Publication Data
US 2012/0292938 A1    Nov. 22, 2012

(30) Foreign Application Priority Data
Jan. 18, 2010    (DE) .......................... 10 2010 004 978

(51) Int. Cl.
*B60R 13/04*    (2006.01)
(52) U.S. Cl.
CPC ........... *B60R 13/04* (2013.01); *B60R 2013/046* (2013.01)
USPC ........................................ 296/1.08; 296/209
(58) Field of Classification Search
USPC .......................................... 296/209, 29, 1.08
See application file for complete search history.

(56) References Cited

U.S. PATENT DOCUMENTS

| | | | |
|---|---|---|---|
| 4,911,495 A * | 3/1990 | Haga et al. ..................... | 296/209 |
| 5,902,007 A | 5/1999 | Koester et al. | |
| 6,748,822 B2 | 6/2004 | Hussy | |
| 8,083,285 B2 * | 12/2011 | Yanagida et al. .......... | 296/181.5 |
| 2003/0094835 A1 * | 5/2003 | Yoshida et al. ................ | 296/209 |
| 2005/0054229 A1 * | 3/2005 | Tsuya et al. ................... | 439/280 |
| 2005/0082813 A1 | 4/2005 | Seong | |
| 2006/0267381 A1 * | 11/2006 | Cave et al. ..................... | 296/209 |
| 2007/0085361 A1 * | 4/2007 | Hauser ......................... | 296/1.08 |
| 2008/0246303 A1 * | 10/2008 | Ryan et al. ............... | 296/136.01 |
| 2009/0261622 A1 * | 10/2009 | Rill et al. ...................... | 296/209 |
| 2010/0078534 A1 * | 4/2010 | Yanagida et al. ........ | 248/220.21 |
| 2010/0212252 A1 * | 8/2010 | Chou et al. ................... | 52/716.5 |
| 2012/0187707 A1 * | 7/2012 | Kwolek ....................... | 296/1.08 |
| 2013/0057009 A1 * | 3/2013 | Turicik et al. ................ | 296/1.08 |

FOREIGN PATENT DOCUMENTS

| | | |
|---|---|---|
| DE | 196 36 505 C1 | 1/1998 |
| DE | 20 009 877 U1 | 8/2000 |
| DE | 10 2006 001 028 | 7/2007 |

* cited by examiner

*Primary Examiner* — Jason S Morrow
(74) *Attorney, Agent, or Firm* — Fulbright & Jaworski LLP

(57) ABSTRACT

The invention relates to a fastening of a longitudinal beam lining (1) on a longitudinal beam (2) of a motor vehicle, comprising a retaining element (3), which is fastened to the longitudinal beam (2). On the end region facing the retaining element (3), the longitudinal beam lining (1) comprises a detent element (4), with which the longitudinal beam lining (1) is latched to the retaining element (3). To reduce the volume of the fastening in comparison with the prior art, the detent element (4) comprises a thickness-reducing indent (5) with respect to the adjoining surface (6) of the longitudinal beam lining (1) that is visible in the installed state of the longitudinal beam lining (1), and the detent element (4) comprises a detent hook (8) on the surface (7) of the longitudinal beam lining (1) that is opposite of the indent (5) and not visible in the installed state of the longitudinal beam lining (1).

19 Claims, 2 Drawing Sheets

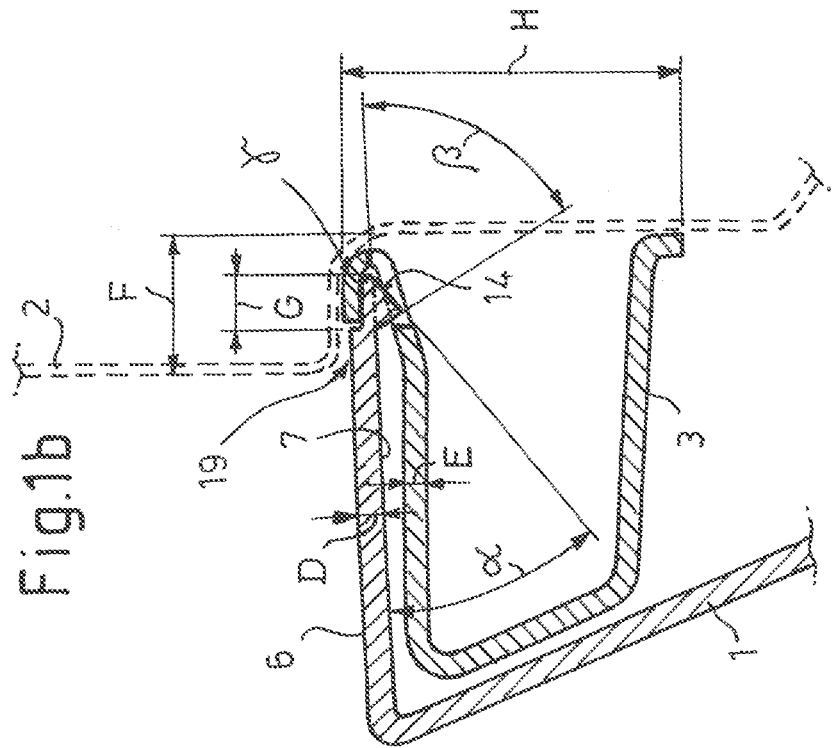
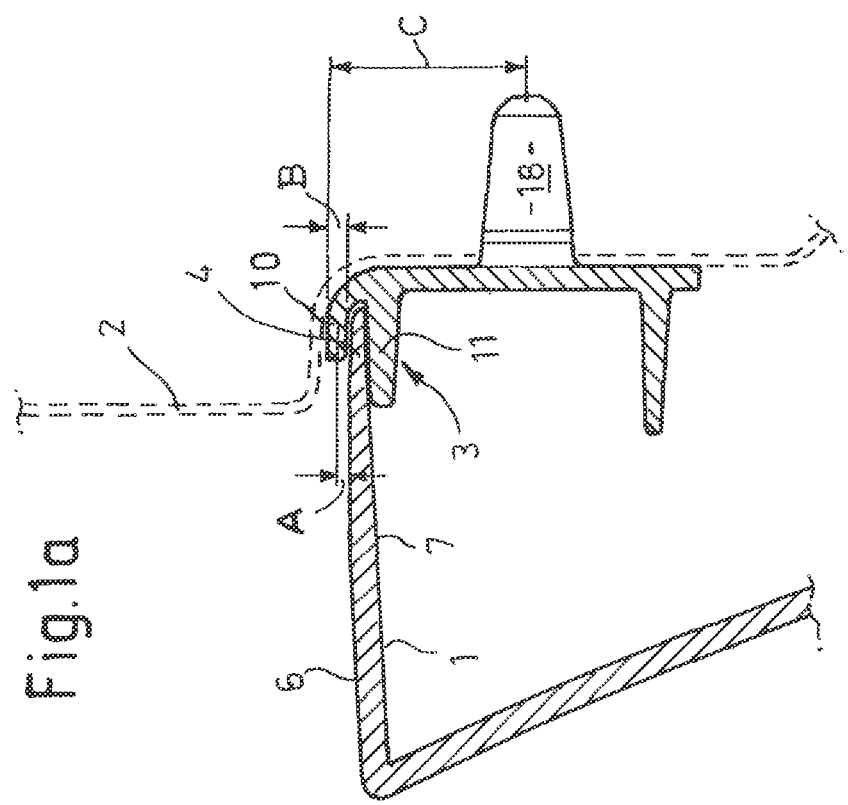

US 8,857,879 B2

FASTENING OF A LONGITUDINAL BEAM LINING ON A LONGITUDINAL BEAM OF A MOTOR VECHICLE

This application is a §371 of PCT/EP2011/050290, filed on Jan. 12, 2011 and claims priority from German Patent Application No. 10 2010 004 978.6 filed on Jan. 18, 2010.

The invention relates to a fastening of a longitudinal beam lining on a longitudinal beam of a motor vehicle, comprising a retaining element which is fastened to the longitudinal beam, and wherein said longitudinal beam lining, on its end region facing the retaining element, has a detent element with which the longitudinal beam lining is latched to the retaining element.

Longitudinal beam linings (also designated as rocker panels) are usually fastened to the longitudinal beam or the vehicle body with many different fastening materials. Preferably, the longitudinal beam linings are fastened with a latching mechanism, wherein the latching units are molded on the longitudinal beam lining so as to save additional fastening material.

In most cases, the molded latching mechanisms are formed on the longitudinal beam lining in such a manner that visible sink marks are created and the longitudinal beam lining has often to be installed in different directions. In most cases, the installing person cannot determine precisely whether the latching mechanism is in proper condition or if the detent elements are deformed and therefore ineffective.

It is an object of the invention to improve a fastening of a longitudinal beam lining on a longitudinal beam of a vehicle in such a manner the constructional volume of the fastening is reduced in comparison with the prior art. Moreover, simple assembly and disassembly in one assembly direction is to be achieved, and a secure, mark-free visual appearance without additional fastening material is to be achieved.

According to the invention, this object is achieved in that the detent element comprises a thickness-reducing indent with respect to the adjoining longitudinal beam lining surface that is visible in the installed state of the longitudinal beam lining, and the detent element comprises a detent hook on the longitudinal beam lining surface which is opposite of the indent: and is not visible in the installed state of the longitudinal beam lining. Through this, the constructional volume of the fastening is reduced in comparison with the prior art. The reduction corresponds at least to the height of the indent.

In a preferred embodiment, the retaining element has a U-shaped latching slot consisting of a retaining leg and a latching leg, and a recess for receiving the detent hook on the detent element of the longitudinal beam lining is arranged in said latching leg. This type of latching slot needs an extremely low installation height and provides for good latching at the same time. Moreover, in case of repair, the latching mechanism can be released again.

In a preferred embodiment, the detent hook has a triangular cross-section, wherein the detent hook has an insertion chamfer which extends from the nose arranged on the tip of the detent element and which transitions at its end facing away from the nose into a retaining chamfer. The insertion chamfer or the chamfer thereof determines the push-in force, i.e., the force that has to be applied for enabling the latching. The retaining chamfer or the chamfer thereof determines the retaining force, i.e., the force with which the detent hook is latched in the recess.

It has been found to be advantageous if, extending from the nose, the insertion chamfer runs at an angle $20°<\alpha<55°$, preferred $30°<\alpha<45°$, particularly preferred $35°<\alpha<40°$, to the longitudinal beam lining surface which is invisible in the installed state of the longitudinal beam lining.

It has further been found to be advantageous if, extending from the end facing away from the nose, the retaining chamfer of the detent hook runs at an angle $40°<\beta<80°$, preferred $50°<\beta<70°$, particularly preferred $55°<\beta<65°$, to the longitudinal beam lining surface which is invisible in the installed state of the longitudinal beam lining.

Preferably, the insertion chamfer transitions at the nose into a joint chamfer which is arranged at an angle $60°<\gamma<100°$, preferred $80°<\gamma<100°$, to the insertion chamfer. This joint chamfer is a centering element during the latching process.

In a preferred refinement, the wall of the recess in the latching leg, which wall faces the retaining chamfer, is adapted to the contour of the retaining chamfer so that in the latched state of the detent hook in the recess, a flat support surface is created. Flat surfaces distribute the occurring forces.

Preferably, the detent hooks are attached such that they cannot deform during assembly, and no surface marks appear on the longitudinal beam lining surface which is invisible in the installed state of the longitudinal lining.

For a durable fastening while maintaining the gap requirement, it is therefore proposed that the longitudinal beam lining comprises molded detent hooks which slide into a retaining rail fastened to the longitudinal beam 2 and latches there.

The invention is further illustrated hereinafter by means of the figures.

BRIEF DESCRIPTION OF THE DRAWINGS

FIGS. 1a, 1b show two sections of an inventive fastening of a longitudinal beam lining 1 on a longitudinal beam 2 of a motor vehicle.

Figure 2:
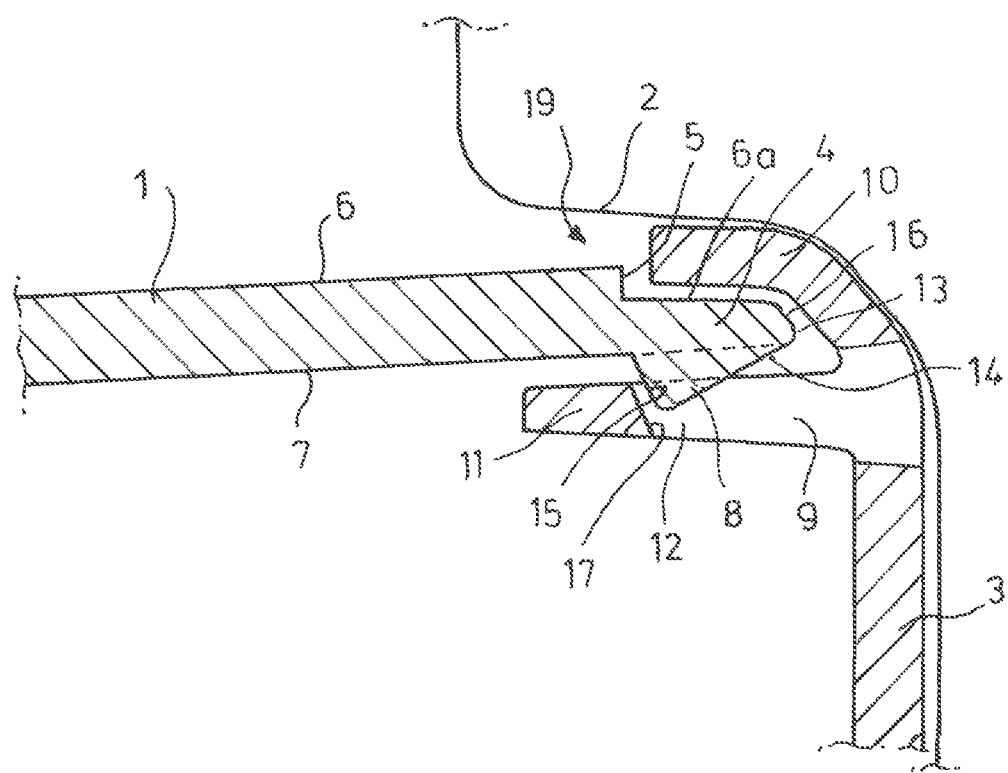
FIG. 2 shows the region of the latching in an enlarged cut-out from FIG. 1b.

In the region of the fastening, the longitudinal beam 2 has a depression in which a retaining element 3 is fastened. For this, a breakthrough is put into the longitudinal beam, in which breakthrough, a retaining pin 18 on the retaining element 3 is inserted. For fastening the longitudinal beam lining 1, the retaining element 3 has a U-shaped latching slot 9 consisting of a retaining leg 10 and a latching leg 11. In the latching leg 11, a recess 12 is arranged for receiving the detent hook 8 on the detent element 4 of the longitudinal beam lining 1.

At its edge, the longitudinal beam lining 1 has a detent element 4 for latching with the detent hook 8. According to the invention, the longitudinal beam lining 1 surface 6, which is visible in the installed state, transitions at the detent element 4 into an indent 5. An indent 5 is to be understood here as a step with which the surface 6 transitions into a surface 6a which is put in at the height of the step. The surfaces 6, 6a are arranged substantially parallel to each other, and the thickness of the longitudinal beam lining 1 outside of the detent element 4 is therefore smaller than the thickness at the detent element 4.

On the surface 7 of the longitudinal beam lining 1, which surface faces the indent 5 and is invisible in the installed state of the longitudinal lining 1, a detent hook 8 is arranged. This detent hook 8 is triangular in cross-section, wherein extending from the nose 13 arranged on the tip of the detent element 4, the detent hook 8 has an insertion chamfer 14 which transitions at its end facing away from the nose 13 into a retaining chamfer 15. With the insertion chamfer 14 or its angle α, the force is set with which the longitudinal beam lining 1 has to be pushed in until it latches. With the retaining chamfer 15 or its angle β, the retaining force of the latching is set. The mentioned angles are drawn in FIG. 1b. FIG. 1b also shows that the insertion chamfer 14 transitions at the nose 13 at an angle γ into a joint chamfer 16. This region with the angle γ serves as centering aid when pushing in.

In the embodiment shown here, the wall 17 of the recess 12 in the latching leg 11, which wall faces the retaining chamfer 15, is adapted to the contour of the retaining chamfer 15 so that in the latched state of the detent hook 8 in the recess 12, a flat support or abutment is created.

The fastening of the longitudinal beam lining 1 on the longitudinal beam by means of a retaining element 3 comprises integrated elements for compensating thermal expansion without the need of additional fastening a elements. The arrangement of detent hooks 8 serving for fastening is integrated in the molded part or in the longitudinal in such a manner that the detent hooks can be produced without standing out, i.e., they are located on the surface that is not visible. This is an essential quality feature. In addition, the arrangement of the components 1, 2, 3 forms a so-called shadow gap 19 which makes the separation edges, detent hooks and connections of gates appear invisible.

The fastening of the longitudinal beam lining 1 on the retaining element 3 is configured such that thermal expansion in the longitudinal direction is possible without deformations of the longitudinal beam lining 1.

The longitudinal beam 2 is designed with simple, preferably round, recesses in receptacle quality. The retaining elements 3 with retaining pins 18 with integrated thermal compensation system are attached thereon. Here too, assembly and disassembly can be carried in a simple manner.

The receptacle quality of the recesses in the longitudinal beam 2 ensures exact positioning of the lining components or the longitudinal beam lining 1. Subsequently, the longitudinal beam lining 1 is brought by means of the joint chamfer 16 and the insertion chamfer 14 in a simple manner into the assembly position and is latched. The latching forces are designed such that the latching forces are <50 N and the pull-off forces are >150 N.

Since the fitter cannot see the latching position, inserting the longitudinal beam lining 1 into the retaining element 3 can also be carried out as "blind operation". This takes place by means of the centering element, i.e. the nose 13 and the joint chamfer 16 which are integrated in the longitudinal beam lining 1 and serve in addition as visible marking for visual inspection by the fitter.

Moreover, simple disassembly and assembly is made possible. The integrated thermal elements ensure temperature compensation between the usual test temperatures of −30°/+90° Celsius without occurrence or visible deformations on the longitudinal beam lining 1.

Below are some preferred dimensions as shown in the figures.

| | |
|---|---|
| A = | 1 mm |
| B = | 2 mm |
| C = | 19 mm |
| D = | 3 mm |
| E = | 2.5 mm |
| F = | 15 mm |
| G = | 6 mm |
| H = | 37 mm |
| α = | 37° |
| β = | 63° |
| γ = | 80° |

It is claimed:

1. A fastening of a longitudinal beam lining on a longitudinal beam of a motor vehicle, comprising:
   a retaining element which is fastened to the longitudinal beam;
   wherein said longitudinal beam has a longitudinal beam lining and a longitudinal beam lining surface;
   wherein said longitudinal beam lining has a detent element on an end region facing the retaining element, wherein said detent element latches the longitudinal beam lining to the retaining element;
   wherein the detent element comprises a thickness-reducing indent with respect to an adjoining longitudinal beam lining surface that is visible in the installed state of the longitudinal beam lining; and
   wherein the detent element comprises a detent hook on the longitudinal beam lining surface which is opposite of the indent and is not visible in the installed state of the longitudinal beam lining.

2. The fastening according to claim 1, wherein the retaining element has a U-shaped latching slot consisting of a retaining leg and a latching leg; and a recess for receiving the detent hook on the detent element of the longitudinal beam lining is arranged in said latching leg.

3. The fastening according to claim 1, wherein the detent hook has a triangular cross-section, wherein the detent hook has an insertion chamfer which extends from a nose arranged on a tip of the detent element and which transitions at an end facing away from the nose into a retaining chamfer.

4. The fastening according to claim 2, wherein the detent hook has a triangular cross-section, wherein the detent hook has an insertion chamfer which extends from a nose arranged on a tip of the detent element and which transitions at an end facing away from the nose into a retaining chamfer.

5. The fastening according to claim 3, wherein extending from the nose, the insertion chamfer (14) runs at an angle 20°<α<55°, to the longitudinal beam lining surface, wherein said longitudinal beam lining surface is invisible in the installed state of the longitudinal beam lining.

6. The fastening according to claim 4, wherein extending from the nose, the insertion chamfer runs at an angle 20°<α<55°, to the longitudinal beam lining surface, wherein said longitudinal beam lining surface is invisible in the installed state of the longitudinal beam lining.

7. The fastening according to claim 5, wherein extending from the nose, the insertion chamfer runs at an angle of 30°<α<45°.

8. The fastening according to claim 6, wherein extending from the nose, the insertion chamfer runs at an angle of 30°<α<45°.

9. The fastening according to claim 5, wherein extending from the nose, the insertion chamfer (14) runs at an angle of 30°<α<40°.

10. The fastening according to claim 6, wherein extending from the nose, the insertion chamfer (14) runs at an angle of 30°<α<40°.

11. The fastening according to claim 3, wherein extending from the end facing away from the nose, the retaining chamfer of the detent hook runs at an angle 40°<β<80° to the longitudinal beam lining surface, wherein said longitudinal beam lining surface is invisible in the installed state of the longitudinal beam lining.

12. The fastening according to claim 4, wherein extending from the end facing away from the nose, the retaining chamfer of the detent hook runs at an angle $40°<\beta<80°$ to the longitudinal beam lining surface, wherein said longitudinal beam lining surface is invisible in the installed state of the longitudinal beam lining.

13. The fastening according to claim 11, wherein the insertion chamfer runs at an angle of $50°<\beta<70°$.

14. The fastening according to claim 12, wherein the insertion chamfer runs at an angle of $50°<\beta<70°$.

15. The fastening according to claim 11, wherein the insertion chamfer runs at an angle of $55°<\beta<65°$.

16. The fastening according to claim 12, wherein the insertion chamfer runs at an angle of $55°<\beta<65°$.

17. The fastening according to claim 3, wherein insertion chamfer transitions at the nose into a joint chamfer which is arranged at an angle $60°<\gamma<100°$ to the insertion chamfer.

18. The fastening according to claim 4, wherein insertion chamfer transitions at the nose into a joint chamfer which is arranged at an angle $60°<\gamma<100°$ to the insertion chamfer.

19. The fastening according to claim 3, further comprising a retaining chamfer, wherein a wall of the recess in the latching leg is provided, wherein the wall of the recess faces the retaining chamfer, is adapted to the contour of the retaining chamfer so that in the latched state of the detent hook in the recess, a flat support surface is created.

* * * * *